(12) United States Patent
Yeager et al.

(10) Patent No.: US 9,903,264 B1
(45) Date of Patent: Feb. 27, 2018

(54) CONTROL SYSTEM FOR AN ENGINE CYLINDER WITH FUEL CONTROL OF PRE CHAMBER AND MAIN CHAMBER

(71) Applicant: Caterpillar Inc., Peoria, IL (US)

(72) Inventors: Mary Louise Yeager, Lafayette, IN (US); Lucas Allen Burger, Lafayette, IN (US); Andrew Loetz, Lafayette, IN (US); Brett Zook, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/296,181

(22) Filed: Oct. 18, 2016

(51) Int. Cl.
| F02B 19/10 | (2006.01) |
| F02D 41/30 | (2006.01) |
| F02B 19/12 | (2006.01) |
| F02B 43/10 | (2006.01) |
| F02D 41/00 | (2006.01) |
| F02D 41/14 | (2006.01) |

(52) U.S. Cl.
CPC .......... F02B 19/1085 (2013.01); F02B 19/12 (2013.01); F02B 43/10 (2013.01); F02D 41/0027 (2013.01); F02D 41/1439 (2013.01); F02D 41/3094 (2013.01); *F02B 2043/103* (2013.01)

(58) Field of Classification Search
CPC ........ F02B 19/00; F02B 19/10; F02B 19/108; F02B 19/1085; F02D 35/023; F02D 35/024; F02D 41/30–41/408
USPC .................. 701/101–104; 123/250–293, 435
See application file for complete search history.

(56) References Cited

U.S. PATENT DOCUMENTS

| 8,215,284 B2 | 7/2012 | Suzuki et al. |
| 2015/0059456 A1 | 3/2015 | Niessner et al. |

FOREIGN PATENT DOCUMENTS

| DE | 3331114 | 3/1985 |
| DE | 202013102541 | 6/2013 |
| DE | 102013210965 | 9/2014 |
| DE | 102013210966 | 12/2014 |
| DE | 102014207272 | * 10/2015 |
| JP | 2001248445 | 9/2001 |
| JP | 2008248750 | 10/2008 |
| WO | 2015172873 | 11/2015 |

* cited by examiner

*Primary Examiner* — Erick Solis
*Assistant Examiner* — Robert Werner (57) ABSTRACT

A control system for an engine cylinder having a pre-chamber and a main chamber includes a pressure sensor being provided in the pre-chamber, and a processor coupled to the pressure sensor. The processor is configured to measure pre-chamber pressure using the pressure sensor, determine a peak pre-chamber pressure from the measured pre-chamber pressure, calculate an estimated main chamber pressure corresponding to the peak pre-chamber pressure from at least one cylinder condition at ignition, calculate a pressure ratio of the peak pre-chamber pressure to the estimated main chamber pressure, calculate a fuel parameter for at least one of the pre-chamber and main chamber from the pressure ratio to achieve a desired pressure ratio, and generate a control signal to provide fuel to at least one of the pre-chamber and main chamber in accordance with the fuel parameter.

13 Claims, 5 Drawing Sheets

CONTROL SYSTEM FOR AN ENGINE CYLINDER WITH FUEL CONTROL OF PRE CHAMBER AND MAIN CHAMBER

TECHNICAL FIELD

The present disclosure generally relates to a control system for an engine cylinder. More particularly, the present disclosure relates to a method for controlling an engine cylinder comprising a pre-chamber and a main chamber.

BACKGROUND

It is well known in the art to provide internal combustion engines having large cylinders with a pre-chamber corresponding to each cylinder in the engine so that a pilot charge of fuel and air introduced into the pre-chamber can accomplish ignition of a fuel-air charge received within a main combustion chamber of a corresponding cylinder. However, controlling an amount of $NO_x$ emissions from the engine may also be required with use of distinct fuel supply strategies typically used with the pre-chambers and the main combustion chambers of a given engine.

A valuable diagnostic for engines with one or more pre-chambers is to measure respective air-fuel ratios in the pre-chambers and the corresponding main combustion chambers present in an engine with the help of one or more sensors which may allow end-users of such engines to estimate an amount of $NO_x$ emissions from an engine. However, one drawback typically associated with such engines may include extremely high temperatures associated with combustion of fuel-air charge in the main combustion chamber, due to which, it may become difficult to operate any sensors that are located in the main combustion chamber.

German Publication DE 10 2014 207 272 discloses a measurement technique which includes the steps of measuring pre-chamber pressure, determining a peak pre-chamber pressure, filtering the pre-chamber pressure measurements and using the filtered version of the respective measurements for controlling a subsequent operation of the engine. However, filtering can sometimes be computationally intensive and laborious.

Hence, there is a need for a system and a method that overcome the aforementioned shortcomings for allowing end-users to conveniently control the operation of engine cylinders having a pre-chamber and a main combustion chamber and achieve low $NO_x$ emissions.

SUMMARY OF THE DISCLOSURE

In one aspect of the present disclosure, a control system for an engine cylinder having a pre-chamber and a main chamber includes a pressure sensor being provided in the pre-chamber. The control system also includes a processor that is configured to measure pre-chamber pressure using the pressure sensor, determine a peak pre-chamber pressure from the measured pre-chamber pressure, calculate an estimated main chamber pressure corresponding to the peak pre-chamber pressure from at least one cylinder condition at ignition, calculate a pressure ratio of the peak pre-chamber pressure to the estimated main chamber pressure, calculate a fuel parameter for at least one of the pre-chamber and main chamber from the pressure ratio to achieve a desired pressure ratio, and generate a control signal to provide fuel to at least one of the pre-chamber and main chamber in accordance with the fuel parameter.

In another aspect of the present disclosure, a method is provided for controlling an engine cylinder having a main chamber and a pre-chamber. The pre-chamber is provided with a pressure sensor. The method includes measuring pre-chamber pressure using the pressure sensor. The method further includes determining a peak pre-chamber pressure from the measured pre-chamber pressure using a processor. The method further includes calculating, using the processor, an estimated main chamber pressure corresponding to the peak pre-chamber pressure from at least one cylinder condition at ignition. The method further includes calculating a pressure ratio of the peak pre-chamber pressure to the estimated main chamber pressure using the processor. The method further includes calculating a fuel parameter using the processor for at least one of the pre-chamber and main chamber from the pressure ratio to achieve a desired pressure ratio, and providing fuel to at least one of the pre-chamber and main chamber in accordance with the fuel parameter.

Other features and aspects of this disclosure will be apparent from the following description and the accompanying drawings.

DETAILED DESCRIPTION

Figure 1:
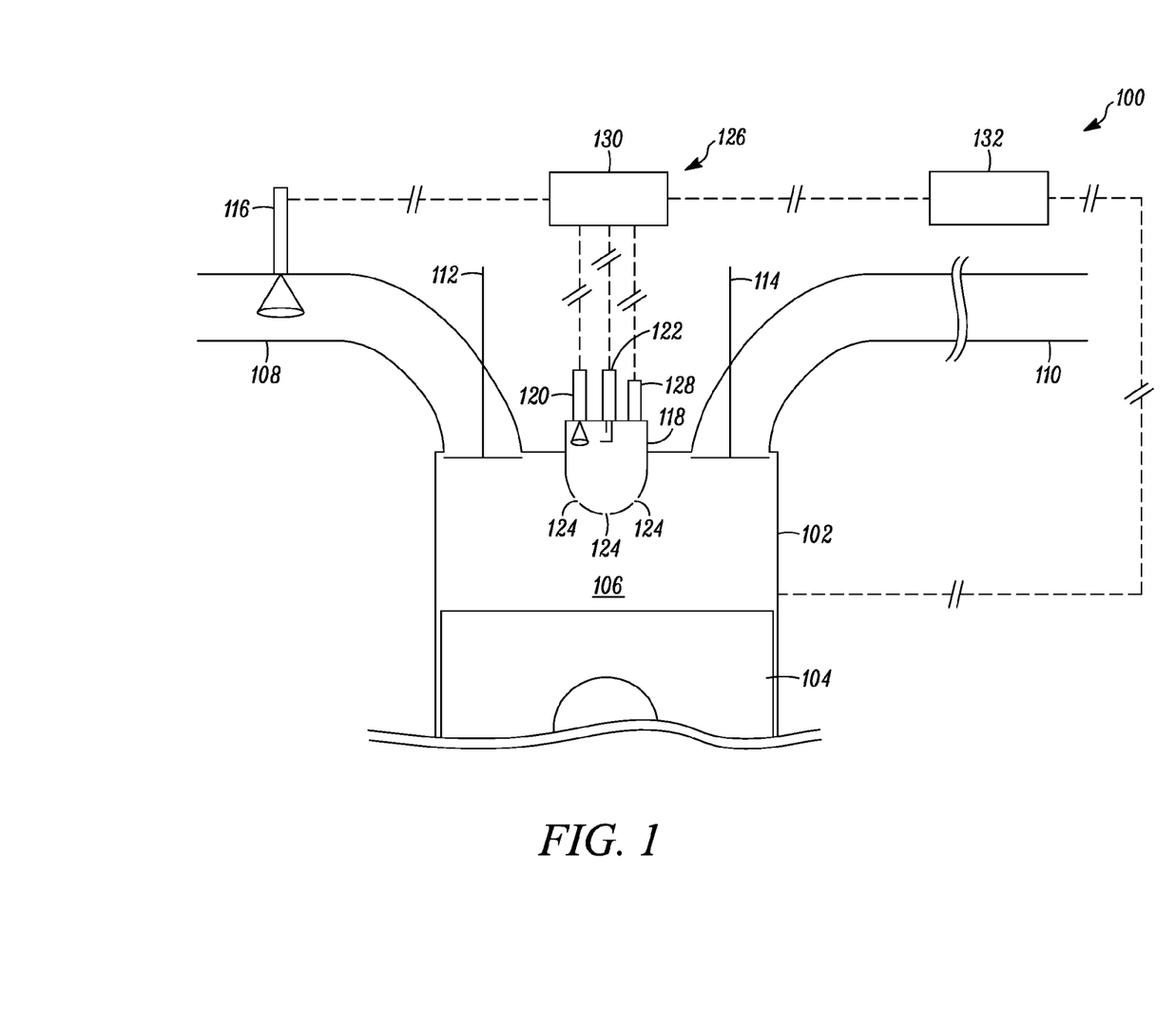
FIG. 1 is a schematic representation of an exemplary internal combustion engine showing an engine cylinder having a pre-chamber and a main chamber, in accordance with embodiments of the present disclosure.

Referring to FIG. 1, an exemplary internal combustion engine 100 is depicted, in which embodiments of the present disclosure may be implemented. As shown, the engine 100 includes a cylinder 102 with a piston 104 slidably disposed therein. A single cylinder 102 is shown in FIG. 1 for simplicity of illustration, however it will be appreciated that the engine 100 could include any number of cylinders depending on specific requirements of an application. It will be equally appreciated that the control system and method described herein can be applied to each cylinder of an engine.

The piston 104 is configured to execute reciprocal movement in relation to the cylinder 102. The cylinder 102 and the piston 104 together define a main chamber 106. The engine 100 also includes an intake pipe 108 and an exhaust pipe 110 disposed in selective fluid communication with the main chamber 106 via an inlet valve 112 and an exhaust valve 114, respectively. The inlet valve 112 is operable to deliver a mixture of fuel and air from a fuel supply device 116 provided in the intake pipe 108 to the main chamber 106. The exhaust valve 114 is operable to allow products of combustion from the main chamber 106 to exit via the exhaust pipe 110 upon combustion of the fuel-air mixture. The engine 100 may run on a natural gas fuel. In alternative embodiments, the engine may run on other fuels including bio-fuels, diesel, heavy fuel oil, or a mix of fuels.

The cylinder 102 also includes a pre-chamber 118 in fluid communication with the main chamber 106. The pre-chamber 118 may be located, for example, in a head (not shown) of the engine 100, in a cylinder block (not shown) of the engine 100, or at any other location depending on specific requirements of an application. The pre-chamber 118 is configured to receive pilot ignition fuel via a pre-chamber fuel supply device 120. It may be acknowledged by persons skilled in the art that a type of fuel and/or a ratio of air-to-fuel i.e., lambda (λ) received in the pre-chamber 118 may be similar or dissimilar to that received in the main chamber 106 depending on specific requirements of an application. Ignition of fuel in the pre-chamber 118 may be carried out with the help of an ignition device 122. The ignited products of combustion from the pre-chamber 118 exit the pre-chamber 118 via one or more passageways 124 and enter the main chamber 106 for ignition of the fuel-air mixture received in the main chamber 106.

With continued reference to FIG. 1, a control system 126 is provided for use in conjunction with the cylinder 102. The control system 126 includes a pressure sensor 128 provided to the pre-chamber 118. The pressure sensor 128 is configured to measure a pressure associated with the pre-chamber 118. Moreover, the control system 126 also includes a processor 130 that is communicably coupled to the pressure sensor 128, the fuel supply device 116, and the pre-chamber fuel supply device 120, explanation to which will be made later herein.

The processor 130 may embody a single microprocessor or multiple microprocessors that include components for controlling operations associated with the cylinder 102. Numerous commercially available microprocessors can be configured to perform the functions of the processor 130 disclosed herein. It should be appreciated that the processor could readily be embodied in a general machine microprocessor capable of controlling numerous machine functions. Alternatively, as shown in the illustrated embodiment of FIG. 1, the processor 130 may be embodied in the form of a stand-alone processor that co-operates with an electronic control module (ECM) 132 associated with the engine. The processor 130 may also be associated with a memory (not shown), a secondary storage device (not shown), and any other components for running an application. Various other circuits may be associated with the processor 130 such as power supply circuitry, signal conditioning circuitry, solenoid driver circuitry, and other types of circuitry. Various routines, algorithms, and/or programs can be programmed within the processor 130 for execution therein to control operations associated with the cylinder 102.

Figure 2:
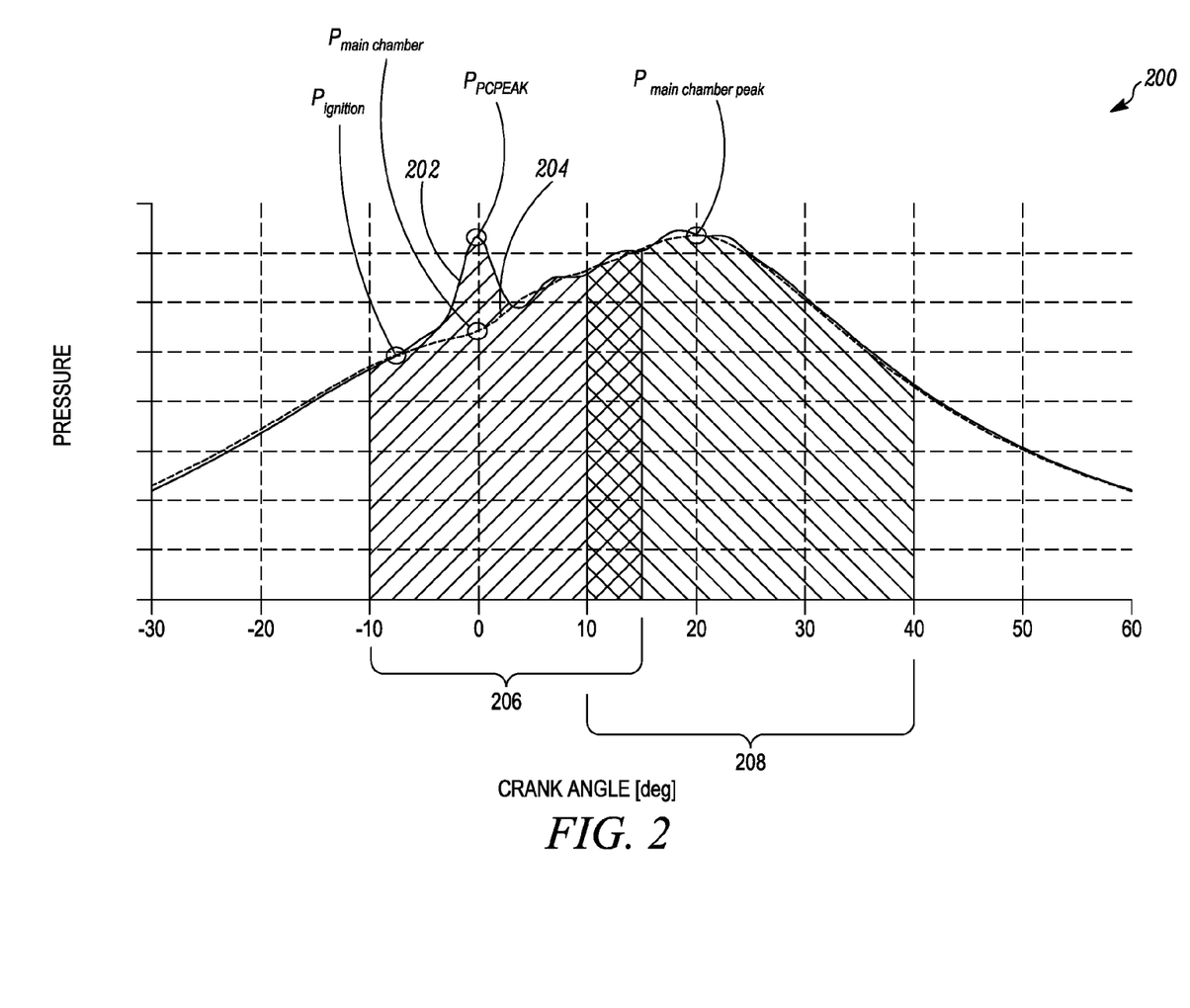
FIG. 2 is a graphical representation of a pair of pressure curves associated with the pre-chamber and the main chamber of the engine cylinder, in accordance with embodiments of the present disclosure.

Referring to FIG. 2, a graph 200 showing pressure curves 202, 204 associated with the pre-chamber 118 and the main chamber 106 respectively is illustrated. The pressure curve 202 associated with the pre-chamber 118 is shown by way of a solid line. The pressure curve 204 associated with the main chamber 106 is depicted by way of a dashed line and has been overlaid for reference.

In an embodiment, the ECM 132 may communicate a pair of predetermined crank angle ranges 206, 208 for pre-chamber ignition and main chamber ignition respectively to the processor 130. It is hereby contemplated that combustion in the pre-chamber 118 would occur at any crank angle within the crank angle range 206 while combustion in the main chamber 106 would occur at any crank angle within the crank angle range 208.

The pair of pre-determined crank angle ranges 206, 208 may partly overlap with one another as shown in FIG. 2, or may conversely be distinct from one another depending on specific engine requirements and ignition timings associated with the pre-chamber 118 and the main chamber 106 respectively. As shown in the illustrated embodiment of FIG. 2, the first predetermined crank angle range 206 associated with pre-chamber ignition lies between −10 to 15 degrees. In other embodiments, other crank angle ranges may be used, as would be apparent to a skilled person. Defining pre-determined crank angle ranges 206, 208 limits unnecessary computation load on the processor 130 by avoiding computations in crank angle ranges that are not of interest, such as crank angle ranges where combustion is not occurring.

Figure 3:
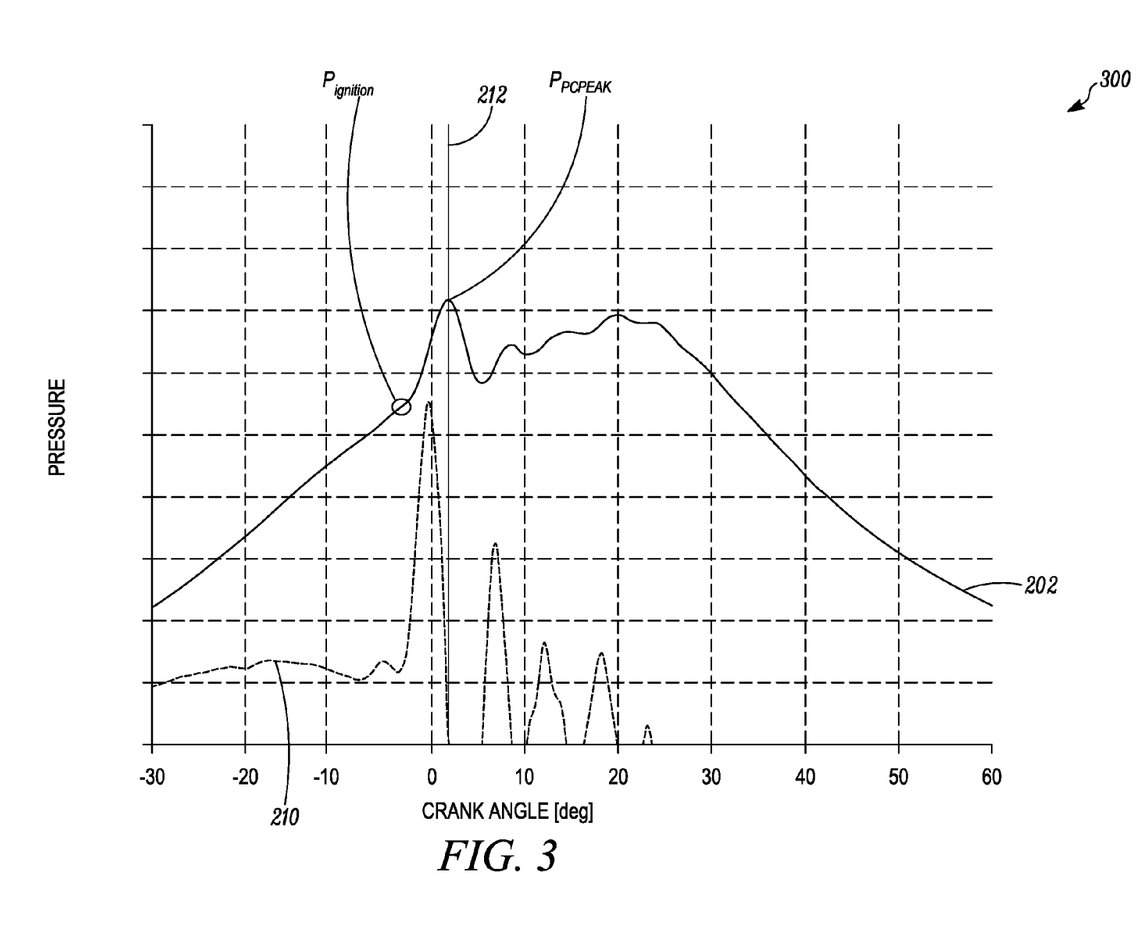
FIG. 3 is a graphical representation of the pressure curve associated with the pre-chamber is shown in which a zero-crossing of a first derivative of the pressure curve is determined, in accordance with embodiments of the present disclosure.

The processor 130 is in communication with the pressure sensor 128 to measure a pre-chamber pressure value via the pressure sensor 128. Processor 130 is further configured to receive the pair of pre-determined crank angle ranges 206, 208 for pre-chamber ignition and main chamber ignition respectively from the ECM 132; in an alternative embodiment the pre-determined crank angle ranges 206, 208 may be stored in a non-volatile memory associated with the processor or embedded therein. The processor 130 is configured to determine a peak pre-chamber pressure $P_{PCpeak}$ within the first predetermined crank angle range 206 associated with pre-chamber ignition. In an embodiment of the present disclosure, the processor 130 computes a first derivative of the measured pre-chamber pressure values, illustrated in FIG. 3 as curve 202, to obtain first derivative values. The first derivative values are shown in FIG. 3 as curve 210 however in other embodiments the first derivative values may be discrete values calculated at predefined intervals by the processor 130. The processor 130 may stores the first derivative values in a non-volatile memory. In some embodiments only the most recently calculated first derivative value is stored in a non-volatile memory by the processor. In other embodiments the processor 130 may communicate the first derivative values to the ECM 132.

The processor 130 then determines the peak pre-chamber pressure $P_{PCpeak}$ from the measured pre-chamber pressure values. In one embodiment of the present disclosure the processor 130 may determine the peak pre-chamber pressure $P_{PCpeak}$ by applying a peak-hold algorithm to the measured pre-chamber pressure values within the first predetermined crank angle range 206. While a peak-hold algorithm is suitable for some applications, it has been found that natural gas combustion engines exhibit a greater degree of cycle-to-cycle variation in their combustion timings than, say, diesel engines. One example of combustion timing variation exhibited by combustion engines using natural gas fuel is where main chamber combustion commences early. Pressure in the pre-chamber 118 during the first predetermined crank angle range 206 due to early main chamber combustion may exceed pre-chamber combustion pressure levels. A peak-hold algorithm may erroneously select a main chamber combustion pressure as the peak pre-chamber pressure $P_{PCpeak}$ in these instances. Alternatively, the processor 130 may determine the peak pre-chamber pressure $P_{PCpeak}$ from the measured pre-chamber pressure values by selecting the measured pre-chamber pressure value corresponding to a zero-crossing of the first derivative values. Zero-crossing of the first derivative values may be determined by the processor 130 when sequential first derivative values change from being positive to negative values. It has been found that the processor 130 using first derivative zero-crossing to determine the peak pre-chamber pressure $P_{PCpeak}$ is more robust than a peak-hold algorithm and may be preferred. Referring to FIG. 3, a vertical line 212 is drawn at a crank angle where the first derivative curve 210 intersects with the X-axis i.e., where the first derivative curve 210 has a value of zero. As seen in FIG. 3, this crank angle coincides with the peak pre-chamber pressure value $P_{PCpeak}$ from the measured pre-chamber pressure curve 202. Thus, upon determining a zero-crossing of the first derivative values, the processor 130 may determine the peak pre-chamber pressure value $P_{PCpeak}$ as the measured pre-chamber pressure when the zero-crossing occurred.

Upon determining the peak pre-chamber pressure value $P_{PCpeak}$, the processor 130 is further configured to calculate an estimated main chamber pressure value $P_{main\ chamber}$ corresponding to the peak pre-chamber pressure value $P_{PCpeak}$ from at least one cylinder condition at ignition. In an embodiment, the at least one cylinder condition may include cylinder pressure at ignition $P_{ignition}$ and cylinder volume at ignition $V_{ignition}$, wherein $P_{ignition}$ and $V_{ignition}$ are the pressure and volume in the main chamber 106 at ignition, respectively, and ignition is the commencement of combustion of fuel introduced into the pre-chamber 118. The processor 130 is configured to calculate the estimated main chamber pressure, $P_{main\ chamber}$, according to the following equation:

$$P_{main\ chamber} = \frac{P_{ingnition} V_{ignition}^\kappa}{V_{main\ chamber}^\kappa}$$

where $P_{main\ chamber}$ is the estimated pressure in the main chamber 106 at a crank angle corresponding to the peak pre-chamber pressure $P_{PCpeak}$, $P_{ignition}$ is the cylinder pressure at ignition, $V_{ignition}$ is the cylinder volume at ignition, $V_{main\ chamber}$ is the volume of the main chamber 106 at a crank angle corresponding to the peak pre-chamber pressure $P_{PCpeak}$, and $\kappa$ is a polytropic coefficient.

To determine $P_{ignition}$ and $V_{ignition}$, the engine ECM 132 may communicate the crank angle corresponding to ignition for the cylinder 102 to the processor 130 using, for example, a CAN datalink message, a public J1939 (IT1-IT5) ignition timing message, or any other type of message known to persons skilled in the art. In an embodiment, the crank angle corresponding to ignition may be determined by the ECM 132 as the crank angle at which fuel was introduced into the pre-chamber 118 using the pre-chamber fuel supply device 120. Pressure in the pre-chamber 118 and main chamber 106 are substantially equal prior to the ignition of fuel in either chamber, so the processor 130 may determine cylinder pressure $P_{ignition}$ from the pressure sensor 128 measurement at the crank angle value corresponding to ignition that is received from the engine ECM 132.

The processor 130 may determine a cylinder volume $V_{ignition}$ from a crank angle, for instance by calculation from known parameters of the cylinder geometry or via suitable look-up table. The processor 130 may determine a value for cylinder volume at ignition, $V_{ignition}$, from the crank angle value corresponding to ignition that is received from the engine ECM 132.

The polytropic coefficient $\kappa$ is a constant value for a given engine configuration and may vary from one engine configuration to another. In an example, a typical default value of the polytropic coefficient $\kappa$ for a gas engine may be 1.37. In other embodiments the engine ECM 132 and the processor 130 may be physically co-located, thereby removing the need for datalink communications. In some embodiments, the engine ECM 132 may comprise a separate software process executing on the processor 130.

Figure 4:
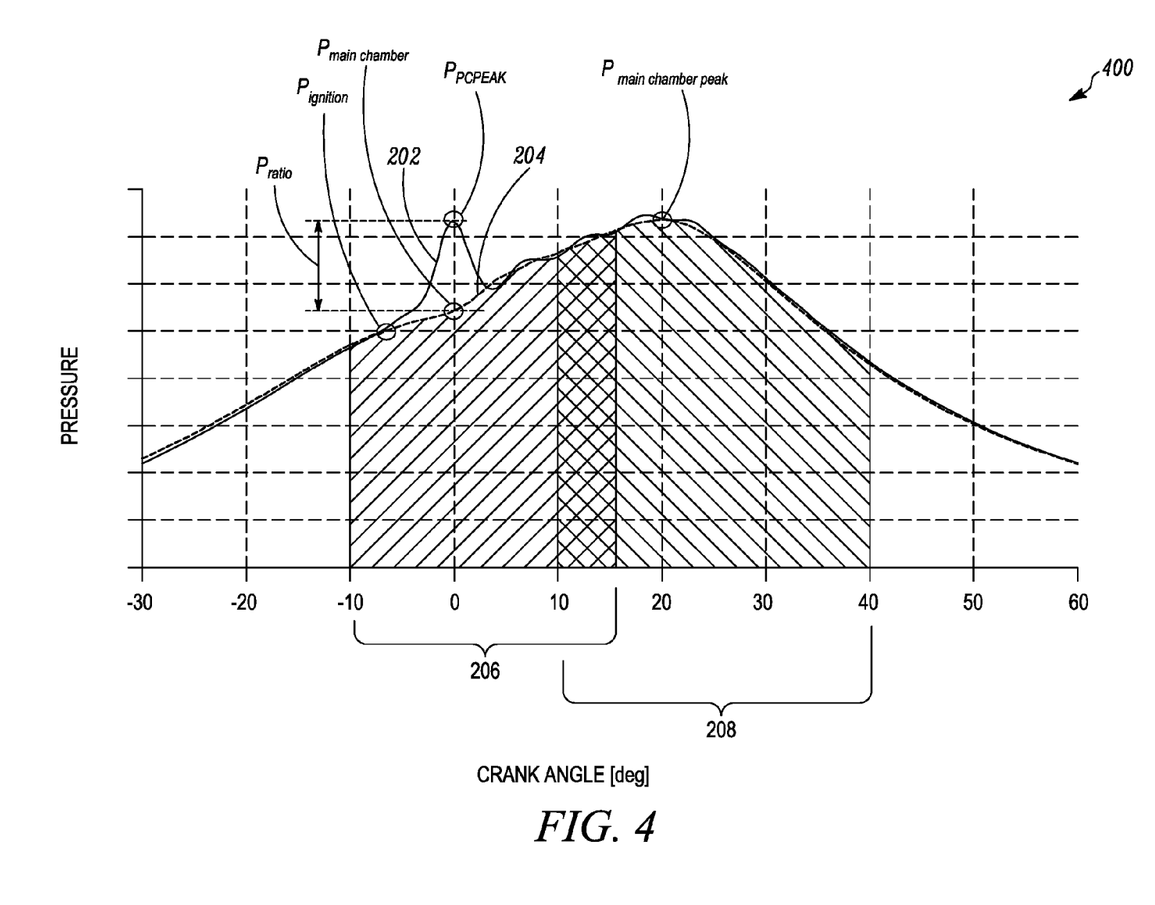
FIG. 4 is a graphical representation of the pair of pressure curves associated with the pre-chamber and the main chamber from FIG. 2 using which a pressure ratio is determined, in accordance with embodiments of the present disclosure.

Referring to a graph 400 depicted in FIG. 4, the processor 130 is further configured to calculate a pressure ratio $P_{ratio}$ of the peak pre-chamber pressure $P_{PCpeak}$ to the estimated main chamber pressure $P_{main\ chamber}$. The pressure ratio $P_{ratio}$ may be computed by the processor 130 using the following equation:

$$P_{ratio} = \frac{P_{PCpeak}}{P_{main\ chamber}}$$

Upon calculating the pressure ratio $P_{ratio}$, the processor 130 is configured to calculate a fuel parameter for at least one of the pre-chamber 118 and main chamber 106 from the computed pressure ratio $P_{ratio}$ to achieve a desired pressure ratio. It has been found that the pressure ratio $P_{ratio}$ provides a measurable estimate of a ratio of the air-to-fuel ratio in the pre-chamber 118 to the air-to-fuel ratio in the main chamber 106. Therefore, a fuel parameter, for example, an amount of fuel delivered to the pre-chamber 118 and/or an amount of fuel delivered to the main chamber 106 may be varied to vary the pressure ratio $P_{ratio}$ to a desired value depending on specific requirements of an application. It is also contemplated that by varying the pressure ratio $P_{ratio}$ to a desired value, an amount of $NO_x$ emissions released in the products of combustion can be beneficially regulated to achieve lower $NO_x$ emissions from the engine 100.

The processor 130 is further configured to generate a control signal to provide fuel to at least one of the pre-chamber 118 and main chamber 106 in accordance with the fuel parameter. The processor 130 may issue a control signal to command the fuel supply device 116 and/or the pre-chamber fuel supply device 120 to vary the amount of fuel delivered to respective ones or both of the chambers i.e., the pre-chamber 118 and/or the main chamber 106 for achieving lower $NO_x$ emissions in the products of combustion by the cylinder 102.

Additionally or optionally, the processor 130 may determine an estimated peak main chamber pressure $P_{main\ chamber\ peak}$ from the measured pre-chamber pressure for use in other engine management decisions. The processor 130 determines the estimated peak main chamber pressure $P_{main\ chamber\ peak}$ within the second predetermined crank angle range 208. As disclosed earlier herein, the processor 130 may receive the second predetermined angle range 208 from the ECM 132 associated with the engine 100 (refer to FIG. 1). As shown in the illustrated embodiment of FIG. 3, the second predetermined crank angle range 208 lies between 10 and 40 degrees. The processor 130 may use the pressure sensor 128 associated with the pre-chamber 118 to determine an estimated peak main chamber pressure $P_{main\ chamber\ peak}$ as it is envisioned that the pre-chamber pressure and the main chamber pressure are similar after pre-ignition i.e., (during the second pre-determined crank angle range 208). It is preferred that a peak-hold method is used to determine the estimated peak main chamber pressure $P_{main\ chamber\ peak}$ within the second predetermined crank angle range 208 as there may be small fluctuations in pressure that make use of the first-derivative method unsuitable for this estimation. In other embodiments the first-derivative method for peak detection may be used in combination with suitable filtering to estimate the peak main chamber pressure $P_{main\ chamber\ peak}$.

In embodiments of the present disclosure, the processor 130 may be implemented using one or more physical computers, embedded devices, field programmable gate arrays (FPGAs), microcontrollers, or computer systems or portions thereof. The instructions executed by the processor 130 may also be read in from a computer-readable medium. The computer-readable medium may be non-transitory, such as a CD, DVD, optical or magnetic disk, laserdisc, flash memory, embedded memory within the processor 130 or any other medium that is readable by the processor 130. In some embodiments, hardwired circuitry may be used in place of or in combination with software instructions executed by the processor 130. Communication among modules, systems, devices, and elements may be over a direct or switched connections, and wired or wireless networks or connections, via directly connected wires, or any other appropriate communication mechanism. Transmission of information may be performed on a hardware layer using any appropriate system, device, or protocol, including those related to or utilizing Firewire, PCI, PCI express, CardBus, USB, CAN, SCSI, IDA, RS232, RS422, RS485, 802.11, etc. The communication among modules, systems, devices, and elements forming the processor and/or the ECM 132 of the present disclosure may include handshaking, notifications, coordination, encapsulation, encryption, headers, such as routing or error detecting headers, or any other appropriate communication protocol or attribute. Communication may also messages related to HTTP, HTTPS, FTP, TCP, IP, ebMS OASIS/ebXML, DICOM, DICOS, secure sockets, VPN, encrypted or unencrypted pipes, MIME, SMTP, MIME Multipart/Related Content-type, SQL, etc.

Figure 5:
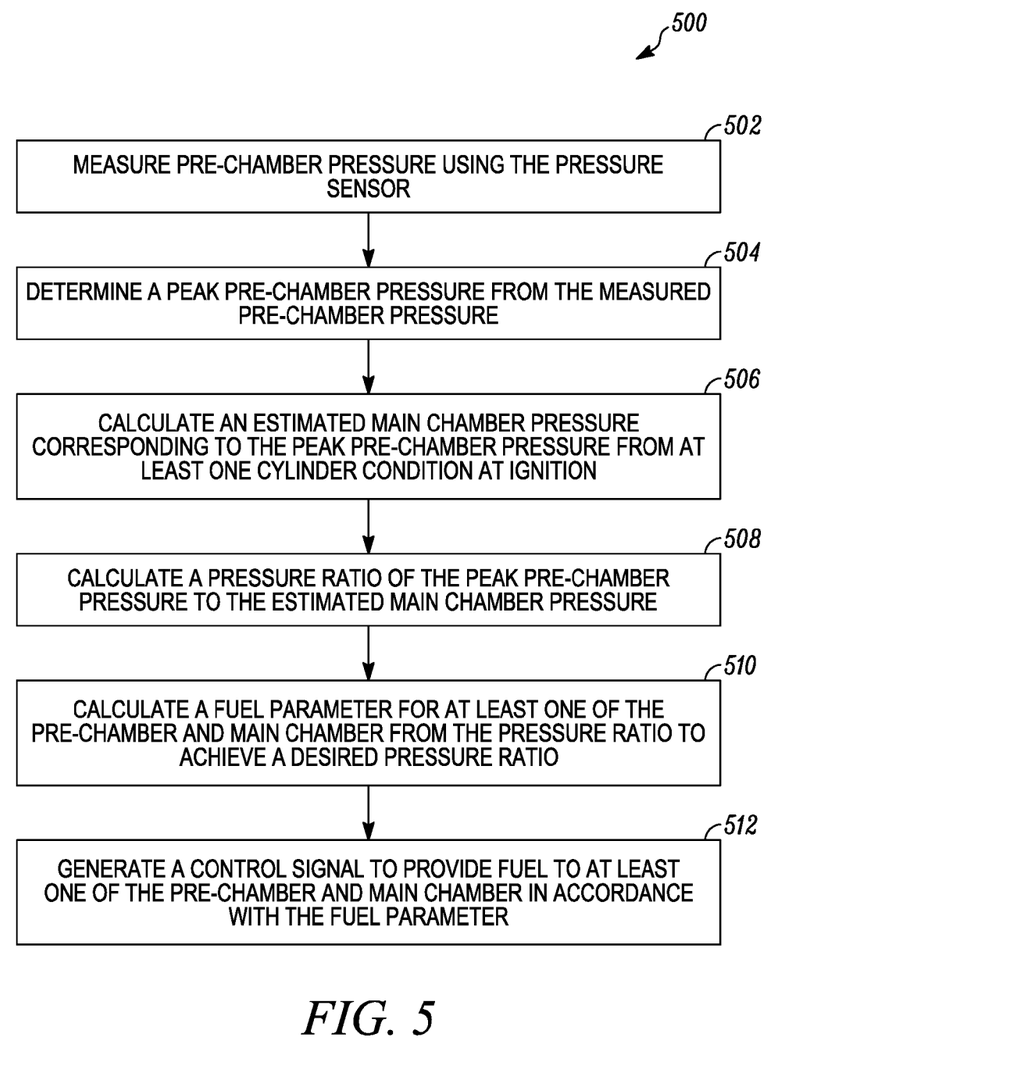
FIG. 5 is a flowchart depicting a method for controlling the engine cylinder having the pre-chamber and the main chamber, in accordance with an embodiment of the present disclosure.

Referring to FIG. 5, a method 500 for controlling the cylinder 102 having the main chamber 106 and the pre-chamber 118 is provided. At step 502, the method 500 includes measuring pre-chamber pressure using the pressure sensor 128. At step 504, the method 500 further includes determining the peak pre-chamber pressure $P_{PCpeak}$ from the measured pre-chamber pressure using the processor 130. At step 506, the method 500 further includes calculating, using the processor 130, an estimated main chamber pressure $P_{main\ chamber}$ corresponding $P_{ratio}$ to the peak pre-chamber pressure $P_{PCpeak}$ from at least one cylinder condition i.e., cylinder pressure $P_{ignition}$ and cylinder volume $V_{ignition}$ at ignition. At step 508, the method 500 further includes calculating the pressure ratio $P_{ratio}$ of the peak pre-chamber pressure $P_{PCpeak}$ to the estimated main chamber pressure $P_{main\ chamber}$ using the processor 130. At step 510, the method 500 further includes calculating, using the processor 130, a fuel parameter from the pressure ratio $P_{ratio}$ to achieve a desired pressure ratio value. At step 512, the method 500 includes providing fuel to at least one of the pre-chamber 118 and main chamber 106 in accordance with the fuel parameter.

Various embodiments disclosed herein are to be taken in the illustrative and explanatory sense, and should in no way be construed as limiting of the present disclosure. It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Embodiments of the present disclosure have applicability for use and implementation in regulating $NO_x$ emissions from an internal combustion engine having a pre-chamber and a main chamber by varying an amount of fuelling to at least one of the pre-chamber and the main combustion chamber based on a desired pre-chamber pressure ratio $P_{ratio}$. It is hereby contemplated that the pressure ratio $P_{ratio}$ is co-related to the ratio of air-fuel ratios in respective ones of the pre-chamber 118 and the main chamber 106, and an amount of $NO_x$ emissions is in turn co-related to the pressure ratio $P_{ratio}$. Therefore, of internal combustion engines can independently and selectively control fuel supply via fuel supply systems i.e., the fuel supply device 116 and the pre-chamber fuel supply 23 using the processor 130 of the present disclosure to regulate an amount of $NO_x$ emissions from the engine 100.

With use of embodiments disclosed herein, manufacturers and end users can therefore, be facilitated with a simple, easy, and effective method of calculating the pressure ratio $P_{ratio}$ which is indicative of the air-fuel ratios in respective ones of the pre-chamber and the main chamber and use a desired pressure ratio for controlling operation of engine cylinders having a pre-chamber associated therewith to regulate $NO_x$ emissions.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:
1. A control system for an engine cylinder comprising a pre-chamber and a main chamber, the control system comprising:
    a pressure sensor being provided in the pre-chamber;
    a processor configured to perform the method steps of:
        measuring pre-chamber pressure using the pressure sensor;
        determining a peak pre-chamber pressure from the measured pre-chamber pressure;
        calculating an estimated main chamber pressure corresponding to the peak pre-chamber pressure from at least one cylinder condition at ignition;
        calculating a pressure ratio of the peak pre-chamber pressure to the estimated main chamber pressure;
        calculating a fuel parameter for at least one of the pre-chamber and main chamber from the pressure ratio to achieve a desired pressure ratio; and
        generating a control signal to provide fuel to at least one of the pre-chamber and main chamber in accordance with the fuel parameter.
2. The control system of claim 1, wherein the processor is further configured to determine the peak pre-chamber pressure as the measured pre-chamber pressure at a zero-crossing of a first derivative of the measured pre-chamber pressure.

3. The control system of claim 2, wherein the processor is further configured to determine the peak pre-chamber pressure within a first predetermined crank angle range.

4. The control system of claim 1, wherein the at least one cylinder condition comprises cylinder pressure at ignition and cylinder volume at ignition.

5. The control system of claim 4, wherein the processor is further configured to calculate the estimated main chamber pressure according to:

$$P_{main\ chamber} = \frac{P_{ignition} V_{ignition}^\kappa}{V_{main\ chamber}^\kappa},$$

where $P_{main\ chamber}$ is the estimated main chamber pressure at a crank angle corresponding to the peak pre-chamber pressure, $P_{ignition}$ is the cylinder pressure at ignition, $V_{ignition}$ is the cylinder volume at ignition, $V_{main\ chamber}$ is the cylinder volume at the crank angle corresponding to the peak pre-chamber pressure, and $\kappa$ is a polytropic coefficient.

6. The control system of claim 1, wherein the processor is further configured to determine an estimated peak main chamber pressure from the measured pre-chamber pressure within a second predetermined crank angle range.

7. A method for controlling an engine cylinder comprising a pre-chamber and a main chamber, a pressure sensor being provided in the pre-chamber, the method comprising:
measuring pre-chamber pressure using the pressure sensor;
determining, using a processor, a peak pre-chamber pressure from the measured pre-chamber pressure;
calculating, using the processor, an estimated main chamber pressure corresponding to the peak pre-chamber pressure from at least one cylinder condition at ignition;
calculating, using the processor, a pressure ratio of the peak pre-chamber pressure to the estimated main chamber pressure;
calculating, using the processor, a fuel parameter for at least one of the pre-chamber and main chamber from the pressure ratio to achieve a desired pressure ratio; and
providing fuel to at least one of the pre-chamber and main chamber in accordance with the fuel parameter.

8. The method of claim 7, wherein determining a peak pre-chamber pressure comprises determining the measured pre-chamber pressure at a zero-crossing of a first derivative of the measured pre-chamber pressure.

9. The method of claim 8, wherein the peak pre-chamber pressure is determined within a first predetermined crank angle range.

10. The method of claim 7, wherein the at least one cylinder condition comprises cylinder pressure at ignition and cylinder volume at ignition.

11. The method of claim 10, wherein the estimated main chamber pressure is calculated according to:

$$P_{main\ chamber} = \frac{P_{ignition} V_{ignition}^\kappa}{V_{main\ chamber}^\kappa},$$

where $P_{main\ chamber}$ is the estimated main chamber pressure, $P_{ignition}$ is the cylinder pressure at ignition, $V_{ignition}$ is the cylinder volume at ignition, $V_{main\ chamber}$ is the cylinder volume at a crank angle corresponding to the peak pre-chamber pressure, and $\kappa$ is a polytropic coefficient.

12. The method of claim 7, further comprising determining an estimated peak main chamber pressure from the measured pre-chamber pressure within a second predetermined crank angle range.

13. A non-transient computer-readable medium containing program instructions for causing a processor to perform the method of claim 7.

* * * * *